(12) United States Patent
Piatt et al.

(10) Patent No.: US 6,792,864 B2
(45) Date of Patent: Sep. 21, 2004

(54) IMAGE FILE DATA EQUIVALENCE ALGORITHMS RESPECTIVE TO OUTPUT DEVICES

(75) Inventors: Michael J. Piatt, Dayton, OH (US); Terry Wozniak, Springfield, OH (US); Joshua H. Howard, Kettering, OH (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/336,134

(22) Filed: Jan. 3, 2003

(65) Prior Publication Data

US 2004/0129160 A1 Jul. 8, 2004

(51) Int. Cl.[7] .................................................. B41F 13/24
(52) U.S. Cl. ........................................ 101/484; 358/1.9
(58) Field of Search ................................. 101/483–485; 400/60–62, 70, 76; 358/1.13–1.18, 1.4, 1.6, 1.9

(56) References Cited

U.S. PATENT DOCUMENTS

| | | | | |
|---|---|---|---|---|
| 5,854,883 A | * | 12/1998 | Madeley | 358/1.9 |
| 6,069,707 A | * | 5/2000 | Pekelman | 358/1.6 |
| 6,072,588 A | * | 6/2000 | Dohnomae | 358/1.9 |
| 6,615,727 B2 | * | 9/2003 | Komori et al. | 101/484 |
| 6,717,601 B2 | * | 4/2004 | Sanger | 347/115 |

* cited by examiner

*Primary Examiner*—Minh Chau
(74) *Attorney, Agent, or Firm*—Barbara Joan Hanshalte

(57) ABSTRACT

The present invention provides a method for reproducing image data from a press output on another device. The present invention mimics color, resolution and frequency of dots used by varying the color saturation (amplitude) of the dots used to mimic the defining characteristics of the source output. By allowing adjustments in both frequency and amplitude to vary from the original output device, it becomes possible to match the resolution and color of the source device.

7 Claims, 4 Drawing Sheets

| 40 | 40 | 40 |
|----|----|----|
| 40 | 40 | 40 |
| 40 | 40 | 40 |

Fig. 2A

| 90 | 0 | 90 |
|----|---|----|
| 0  | 0 | 0  |
| 90 | 0 | 90 |

IMAGE FILE DATA EQUIVALENCE ALGORITHMS RESPECTIVE TO OUTPUT DEVICES

TECHNICAL FIELD

The present invention relates to image processing and, more particularly, to a method of representing a continuous tone image to reproduce image character and image color.

BACKGROUND ART

In traditional offset printing, a facsimile of the final document to be printed for the purpose of proofing may typically be created on a slow, high quality, low volume desktop device for customer approval. It is the intent of the offset press to match this proof. Such a proof is called a contract proof. Until recently, the resolution of the typical offset press greatly exceeded the resolution of most commercial "off the shelf" inkjet printers. Prior to the use of digital inkjet proofs, the contract proof may have been created using the exact film that would be used to image the plates for the offset run. By using similar ink, and similar media, the high quality proofing system could be made to match the offset press in both dot structure and color. The customer may sign the single copy produced by the proofer and attend the press run to make sure that the offset press output matched the proof prior to the start of mass production. Proof copies would typically not be created directly on the press due to the cost, waste, make-ready time and lost production time. The offset press is designed to make thousands or more copies while the high quality proofer would be optimized for creating just a single copy.

Present high quality inkjet proofers, on the order of 2400 or more dots per inch (dpi) have greatly reduced the time and expense involved in creating an offset proof. These high quality devices can now mimic the high quality achieved on an offset press. However, high speed digital inkjet presses print at a resolution lower than the desktop inkjet proofing devices. A proof of the continuous tone data produced by one of these devices exceeds the quality and character of output achievable on the digital press.

In order to better mimic the output of the digital press and to allow the digital press to meet or exceed the quality found on these proofs, the apparent resolution of these desktop proofing devices must be lowered to match that of the digital press. It is necessary to do this so that the contract proof will not overestimate the quality expectations of the digital press. This is most easily accomplished on proofing devices which have resolutions that are multiples of the digital printing press resolution. Merely reducing the resolution of the data is not sufficient to reproduce the printing artifacts of the digital press. For example, it is necessary to account for dot size within a pixel as well as the dot dispersion algorithm used to create the tone scale on the digital press. These factors contribute to the apparent "graininess" of the digital press.

It is seen, therefore, that it would be desirable to define a method of image processing digital press data for the purpose of reproducing the image data on another device in such a way as to mimic both the color and the dot structure of the press output, without applying the stringent conditions of exact color match and dot structure of the press.

SUMMARY OF THE INVENTION

The present invention relaxes the stringency with which the proofing process must exactly match the source process in both resolution and frequency of dots. As long as the defining characteristics of the source process can be incorporated into the proofing process, the output can be made to closely resemble the source process, resulting in an accurate rendition of the digital press output.

In accordance with one aspect of the present invention, a method is provided for reproducing image data from a press output on another device. The present invention mimics color, resolution and approximate spatial frequency of dots characteristic of the source output. By allowing adjustments in both the spatial frequency (i.e., frequency modulation or FM) and the color intensity (i.e., amplitude modulation or AM) to vary from the original output device, it becomes possible to match the image artifacts, apparent resolution and color of the source device.

Other objects and advantages of the invention will be apparent from the following description, the accompanying drawings and the appended claims.

BRIEF DESCRIPTION OF THE DRAWING

FIG. 2A is a representation of the original continuous tone input;

FIG. 2B is a representation of source data for the device A of

FIG. 1, which can differ from the original continuous tone input of FIG. 2A;

DETAILED DESCRIPTION OF THE PREFERRED EMBODIMENTS

Figure 1:
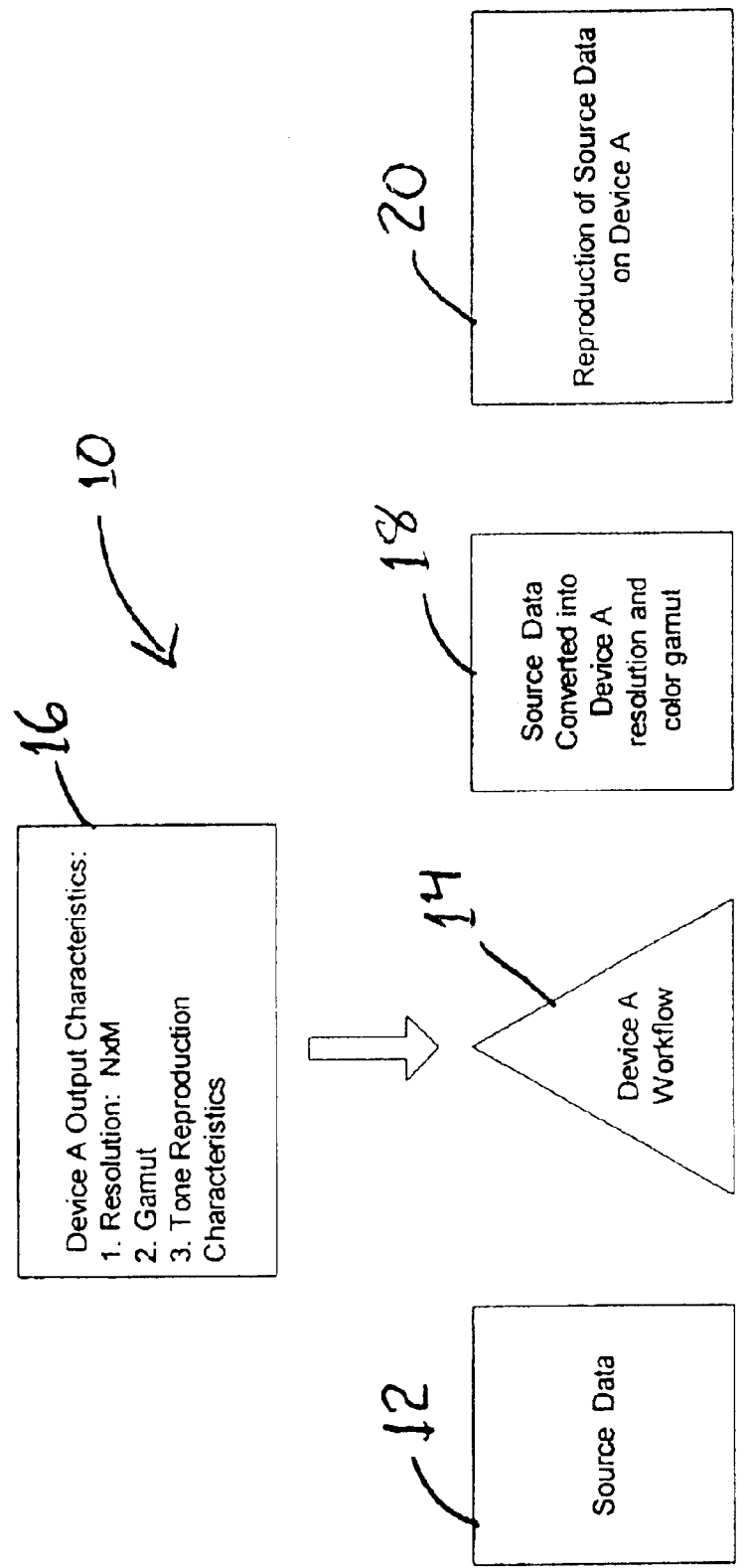
FIG. 1 is a workflow for a device A.

The primary resolution, defined as the lowest resolution of the rectangular resolution of the first printing device, and the droplet dispersion algorithm, together determine print artifacts on the macro level, i.e., as viewed at normal reading distance without magnification. The prior art has required that the ready-to-print file be available for repurposing for the proofing device. The ready-to-print file contains the proper resolution and droplet dispersion techniques. The present invention defines a method to approximate this result without access to the ready-to-print file.

The present invention optimizes the match of resolution and frequency of dots and color between a contract proof and an offset press run of the same image. In the existing art, simulating the apparent grain structure of the digital press on a high quality desktop printing device is done by limiting the number of discrete colors produced on the desktop proofer to the finite number of colors used, on a pixel by pixel basis, by the digital press to create full processed color images. Depending upon the bit depth of the digital press, this constraint can severely limit the output gamut of the superior desktop printing system. The present invention defines a method of image processing digital press data for the purpose of reproducing the image data on another device in such a way as to mimic both the color and the dot structure of the of the press output without adhering to the stringent conditions currently required for matching the exact color and dot structure of the press. As long as the defining characteristics of the source process can be incorporated into the proofing process, the output can be made to closely resemble the source process, resulting in an accurate rendition of the digital press output.

In most circumstances, the press output will have fewer droplets of higher intensity than the proof copy. However, this may not always be the case. If the proofing device is of a resolution slightly below that of the press, then a substitution table could make the resulting droplet darker than those created on the press. If the resolutions are close enough, the apparent image quality of the press would be a good approximation.

In setting up a color printing job for use on a color printing press, it is common to employ software such as Adobe Photoshop to manipulate the color images. A couple of the steps commonly carried out are to modify the image data to allow it to print as desired on the color printing press. These steps are necessary in part to deal with the variations in ink-paper interaction encountered for different substrates. These steps may include: conversion of the image data from Red-Green-Blue (RGB) format to Cyan, Magenta, Yellow, and Black (CMYK) data format; conversion from the generic CMYK data to a CMYK specific to the inks used on the printer, rescaling the color intensity of the image data to avoid excessive application of ink to the paper; and linearizing the data to get truer colors throughout the tone scale and conversion to halftone by error diffusion or other halftoning process. Other processes may be included, as will be recognized by those skilled in the art of image manipulation, for the purpose of optimizing printed image quality.

The present invention is targeted at providing a means to produce proof copies of the image prior to sending them to the color printing press. Ideally, such proof copies would be printed using a high quality desktop color printer. For the proofs to be useful, it is necessary that the print quality of the proof copy should represent closely the print quality of the corresponding image printed on the color printing press, both in terms of the color match between the images and in terms of the visible texture of the images. The repurposing of actual binary image data formatted for the press as described in commonly assigned, co-pending application Ser. No. 10/336376, totally incorporated herein by reference, defines one way to reproduce the press output. Often times, the final press data is not available for proofing. The present invention addresses the need to create color accurate proofs exhibiting the same dot structure as prints from the digital press, directly from the original unprocessed multi-bit images.

In a typical workflow to prepare an image for use on a color printing press, the original color image file would be processed by a 4 dimensional transform to convert the image data from the RGB format to the CMYK format appropriate to the color printing press. This transform might involve two steps. First, the data is converted into a generic CMYK, and then converted from that format into a CMYK format tuned to the inks being used. Alternatively, this transformation can be made in a single processing step. The individual color separation planes, such as cyan, can then be linearized to more uniformly shift from light to dark and can be rescaled to limit the ink loading of the paper. Typically, the maximum coverage level is reduced to prevent ink bleeding, ink show through, and paper cockle problems. After these steps are complete, individual color planes can be dithered using various techniques, including error diffusion. The individual color separations are then ready to print.

An example workflow to make a proof copy of an image to be printed on a color printing press requires means to map the colors and textures printed on the digital press to those printed on the proofing printer. This can be accomplished by doing an image conversion to an indexed color image using a similar set of X^N index colors, with the conversion being carried out at the resolution of the digital press printer rather than at the resolution of the proofing printer. These X^N indexed colors are derived by measuring the color printed by the digital press corresponding to these $X^N$ inking options, where X is the bit depth of the output device and N is the number of primary colors in the system. Note, for example, that X can be 8 or 16 and N may be 3 RGB or 6 CMYK Orange, Green. The color management software, can then determine the proper inking levels for the proofing printer to match the color of the X^n defined index colors.

If the conversion of the full color image to the indexed color format, for the purpose of proofing, is done with the same set of index colors as the press but with the conversion being carried out at the resolution of the digital press, the colors and the textures will match, as long as the data being converted to the index color format has also gone through the same image manipulations that preceded the conversion to the indexed color format.

The present invention defines a method of image processing digital press data for the purpose of reproducing the image data on another device in such a way as to mimic both the color and the dot structure of the press output without the conditions of matching the exact color and dot structure of the press. To accomplish this, the unprocessed multi-bit image, restined for the press, is processed through a parallel path whereby color management is first applied to the image resulting in a binary image at a square resolution representative of the press fundamental resolution. Next, a color managed substation color palette of the order X^n is used to create a color accurate proof. The error diffusion processes used to reduce the alternate workflow image to binary form may result in a higher or a lower spatial frequency of printable dots, at the fundamental resolution of the press, than the actual "ready to print" press image file.

As long as the defining characteristics of the source process can be incorporated into the proofing process, the output can be made to closely resemble the source process resulting in an accurate rendition of the digital press output. The stringency that the proofing process has heretofore required is relaxed by application of this invention, by varying the amplitude of the dots used to mimic the defining characteristics of the source output. By allowing the adjustments in both frequency and amplitude to vary from the original output device, it becomes possible to match the resolution and color of the source device. Once the character of the source output is recorded, the original source data can be modified for another device through a number of processes such that the modified output conforms to the output characteristics of the source device, with regard to parameters of color, resolution, and dot structure.

Referring now to the drawings, FIG. 1 is a diagram 10 representing workflow for a device A. Continuous tone source data from block 12 is modified for output on device A at block 14 in such a way that the color of the continuous tone data is approximated by the resolution, the gamut, and tone reproduction characteristics of device A, with such output characteristics applied from block 16. Various transforms may be applied to the continuous tone source data in order to convert it into data that will approximate the source characteristics. The source data can be converted into a resolution and color gamut for device A, at block 18. Such processes may include, but are not limited to: resolution alteration, linearization, sharpening, color space transformation, dithering, screening, error diffusion, etc. These processes are applied to the continuous tone source data so that the original data may be reproduced optimally on the device A, at block 20.

The image data, as it is reproduced on the output device A and illustrated in FIG. 2B, may have a resolution, gamut and tone characteristics which vary from the original continuous tone input shown by FIG. 2A. The color reproduction characteristics of device A can be measured and recorded, and a transfer function built to model the relationship between the source data, shown by FIG. 2A, and its reproduction on device A, shown by FIG. 2B.

Once such an output model to account for color characteristics has been established, this model, which may take the form of an ICC profile, and along with the known resolution and tone reproduction characteristics of device A, can be modeled on a device B without having access to the modified data, the workflow of device A, or precise and accurate descriptions of the device A workflow. This is illustrated by the diagram 22, shown in FIG. 3, representing the workflow if device B that mimics device A, based on output characteristic data that models device A, from FIG. 1.

Figure 3:
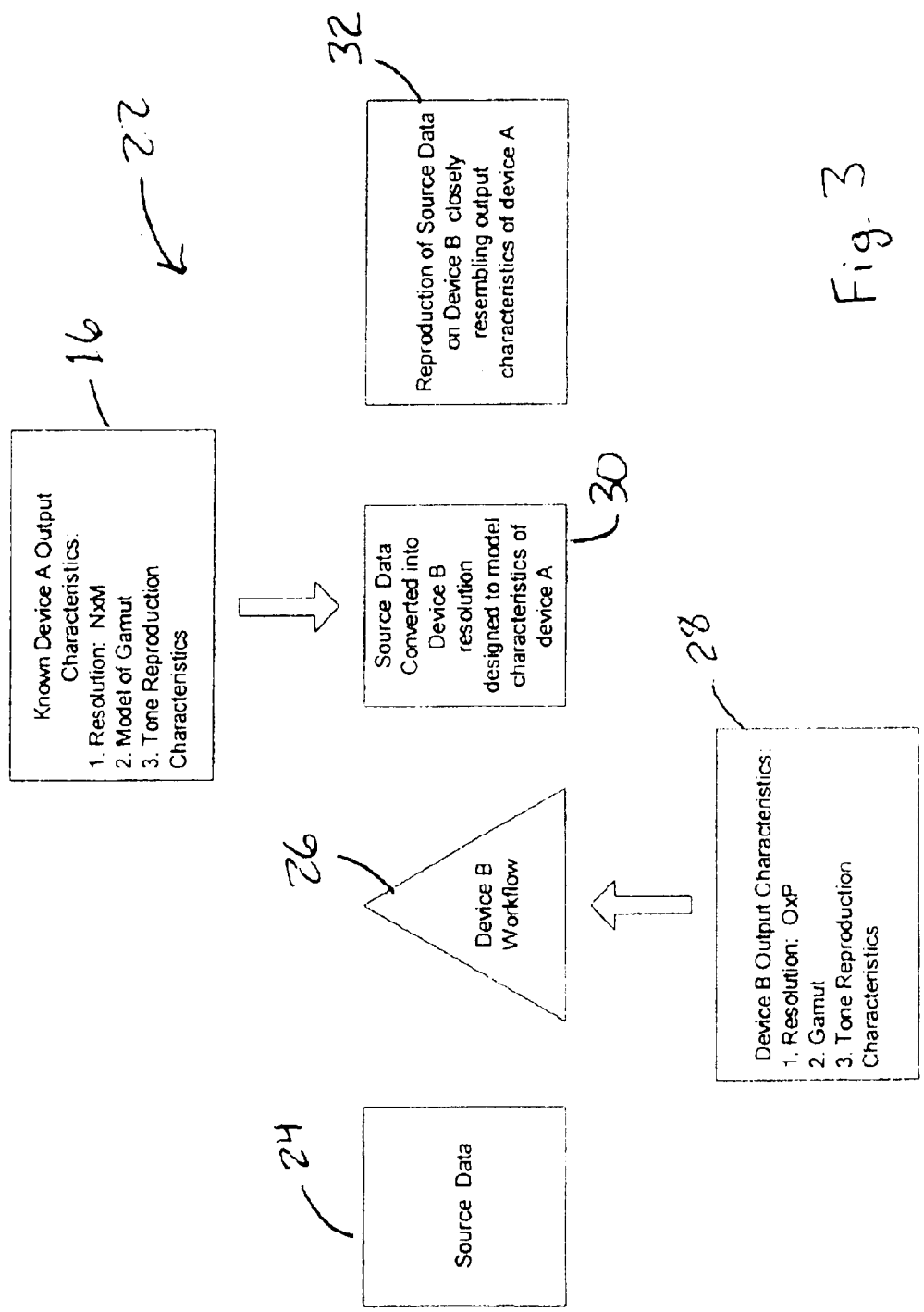
FIG. 3 is a workflow for device B, mimicking that of device A, based on output characteristic data modeling device A.

In FIG. 3, source data from block 24 is applied to a device B workflow at block 26. Device B output characteristics from block 28, along with the known output characteristics of device A from block 16, modify the source data from 24 to convert, at block 30, the source data into device B resolution that models the characteristics of device A. The device A characteristics from block 16 are used to impart macro color characteristics to higher frequency representation on device B of device A processes, such that resulting output at block 32 resembles the device A process in both resolution, image character, quality and color.

The known resolution and tone reproduction characteristics of device A can modified for device B, such as by applying a higher frequency, lower amplitude visual equivalent of device A for device B. The complete workflow diagram 34, illustrated in FIG. 4, applies the proofing process of the present invention, to represent a continuous tone image for the purpose of reproducing both the image character and the original image color of device A, for device B. Source data at block 36, comprised of source data 12 and source data 24 from FIGS. 1 and 3, respectively, is applied to the source process workflow 10 and the workflow 22 that is intended to approximate the source process 10. Also applied to the source process workflows 10 and 22, are the source output characteristics 16 and 28, respectively. The resulting visually equivalent images at 36 will be made up of pixels which vary in both frequency and amplitude. Such pixels can be grouped in such a way that the tones can be shown to be measurably different when pixels of like color are together. The proofing process tone values are lighter than that of the source process, but because the results are visually equivalent, the source process could also be used as the proofing process, allowing for darker tones to be used in the proofing process.

The primary resolution, defined as the lowest resolution of the rectangular resolution of the first printing device, and the droplet dispersion algorithm, together determine print artifacts on the macro level, i.e., as viewed at normal reading distance without magnification. The prior art has required that the ready-to-print file be available for repurposing for the proofing device. The ready-to-print file contains the proper resolution and droplet dispersion techniques. The present invention defines a method to approximate this result without access to the ready-to-print file. This is accomplished by directly transforming the continuous tone image from which the ready-to-print file was derived, using a similar droplet dispersion technique. For example, the dot dispersion technique should be similar to that of the source file, and the primary resolution should be similar to the source output characteristics. That is, the source output characteristics of the first printing device are a function of the primary resolution. Consequently, the primary resolution is mimicked on the second printing device to get a resolution that appears the same as that of the first printing device, by having the same spatial frequency. Furthermore, if diffusion has been applied to one file, error diffusion should be applied to the mimicking file; if dithering has been applied to the source file, then dithering should be applied to the mimicking file; if screening has been applied to the source file, then screening should be applied to the mimicking file; and if other dot dispersion techniques have been applied to the source file, then similar dot dispersion techniques should be applied to the mimicking file. After applying the similar dot dispersion technique, a substitution transformation is used to correct the newly created binary file. This new binary file may contain a different number of droplets than the ready-to-print file at the same primary resolution. A look-up table can be used, which is a function of the press colorants and media of the original ready-to-print file. This look-up table may contain tone values that have been linearized in accordance with the teachings of commonly assigned, co-pending patent application Ser. No. 10/008,825, totally incorporated herein by reference, since tone scale is a function of press colorants and media. Linearized tone substitutions from a palette can correct nonlinear image data.

Application of the present invention is particularly useful when images are processed for printing just prior to printing, at or near the location of the press. Image data intended for the press may be created far in advance and at a different location by different personnel and hardware than used to create the ready-to-print press file. The present invention allows for a simulation in order to get an advance look at the press output.

Figure 4:
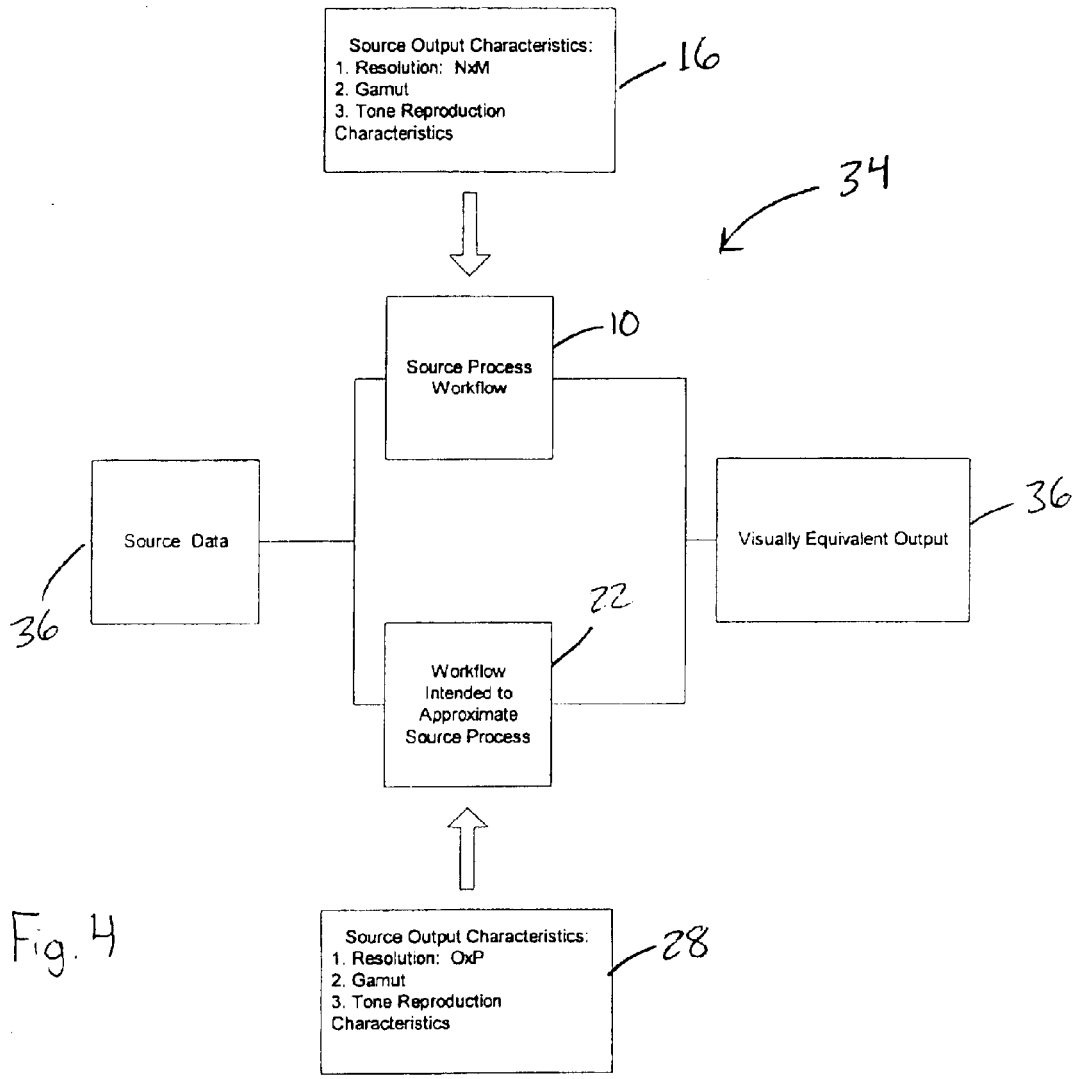
FIG. 4 illustrates a complete workflow, applying the concepts of the present invention.

The advantages of the workflow illustrated in FIG. 4 are many. For example, the final color separated output data is not required to create a suitable proof. Additionally, multiple International Color Consortium (ICC) color definition files, each simulating a different workflow, can be used to modify the proof data to illustrate the effects of changes in a workflow, such as changing the linearization or the substrate. Continuous tone data can be color separated and dithered at multiple quality levels of the output device to simulate various resolutions. The effects of different tone scale correction table and upper ink limits can be simulated on the proofing device using the same approach. Different droplet dispersion methods can also be evaluated using this proofing technique.

In application, an ICC profile can be created to record the gamut and output characteristics of a given workflow for a given device. The source data would undergo the same linearization and digital processing steps and be outputted on the same medium or substrate that the ICC profile was created from. The original continuous tone data can be color separated and dithered at the resolution of the source device, to simulate some of the dot structure, grain and output characteristics of the source device. This data can then be converted into a continuous tone file so that the source ICC can be associated with the new data. The source ICC defines the gamut of the source device and, when used in conjunction with a destination ICC defining the gamut of a proofing device, the data can be converted so that the proofing device outputs the closest representation of the source process.

The invention has been described in detail with particular reference to certain preferred embodiments thereof, but it will be understood that modifications and variations can be effected within the spirit and scope of the invention.

What is claimed is:

1. A method for reproducing image data from a first printing device on a second printing device using a continuous tone file from which a ready-to-print file is derivable, the method comprising the steps of:

defining a primary resolution as a lowest resolution of a rectangular resolution of the first printing device;

identifying source output characteristics as a function of the primary resolution, for the first printing device;

applying substantially equivalent dot dispersion techniques to the ready-to-print file destined for the first and the second printing devices;

mimicking the identified source output characteristics of the first printing device on the second printing device to create a mimicking file by varying dot intensity and spatial frequency of pixels used by the first printing device to print an image, whereby primary resolution artifacts and color of an image printed by the second printing device substantially match primary resolution artifacts and color of the image printed by the first printing device.

2. A method as claimed in claim 1 wherein the step of applying substantially equivalent dot dispersion techniques further comprises the step of applying error diffusion to the first and second printing devices.

3. A method as claimed in claim 1 wherein the step of applying substantially equivalent dot dispersion techniques further comprises the step of applying dithering to the first and second printing devices.

4. A method as claimed in claim 1 wherein the step of applying substantially equivalent dot dispersion techniques further comprises the step of applying screening to the first and second printing devices.

5. A method as claimed in claim 1 wherein the step of applying substantially equivalent dot dispersion techniques will occur prior to any ink load adjustment.

6. A method as claimed in claim 5 wherein the step of mimicking further comprises the step of applying a secondary transformation to substitute in lighter shades to account for non-adjustment of the ink load.

7. A method as claimed in claim 1 wherein print artifacts on a macro level are determined by the primary resolution and a droplet dispersion algorithm.

* * * * *